US008177882B2

(12) United States Patent
Halpin et al.

(10) Patent No.: US 8,177,882 B2
(45) Date of Patent: May 15, 2012

(54) PROCESS FOR RECOVERING METALS AND METAL COMPOUNDS FROM MINED ORE AND OTHER METAL-BEARING RAW SOURCE MATERIALS

(75) Inventors: Peter T. Halpin, Great Falls, VA (US); Ulrich R. Schlegel, Washington, DC (US); Dale L. Schneck, Pottsville, PA (US)

(73) Assignee: World Resources Company, McLean, VA (US)

( * ) Notice: Subject to any disclaimer, the term of this patent is extended or adjusted under 35 U.S.C. 154(b) by 0 days.

(21) Appl. No.: 12/770,134

(22) Filed: Apr. 29, 2010

(65) Prior Publication Data

US 2010/0278686 A1 Nov. 4, 2010

Related U.S. Application Data

(60) Provisional application No. 61/174,205, filed on Apr. 30, 2009, provisional application No. 61/293,419, filed on Jan. 8, 2010.

(51) Int. Cl.
*C22B 3/12* (2006.01)
(52) U.S. Cl. ........................................... 75/739; 423/55
(58) Field of Classification Search .................... 75/739; 423/55
See application file for complete search history.

(56) References Cited

U.S. PATENT DOCUMENTS

| | | | |
|---|---|---|---|
| 3,720,547 A | 3/1973 | Melotik | |
| 4,012,484 A * | 3/1977 | Lussiez | 423/53 |
| 4,029,734 A | 6/1977 | Stauter et al. | |
| 4,151,257 A | 4/1979 | Muller et al. | |
| 4,162,294 A | 7/1979 | Witzke et al. | |
| 4,171,248 A * | 10/1979 | Carlin | 205/483 |
| 4,435,369 A | 3/1984 | Simpson | |
| 4,752,379 A | 6/1988 | Delaney | |
| 4,954,168 A * | 9/1990 | Crnojevich et al. | 423/55 |
| 5,002,645 A * | 3/1991 | Eastland et al. | 204/157.42 |
| 5,007,960 A * | 4/1991 | Baturay et al. | 75/743 |

(Continued)

OTHER PUBLICATIONS

International Search Report and Written Opinion in International Application No. PCT/US2010/001259, Jun. 29, 2010.

(Continued)

*Primary Examiner* — George Wyszomierski
*Assistant Examiner* — Tima M McGuthry Banks
(74) *Attorney, Agent, or Firm* — Bacon & Thomas, PLLC

(57) ABSTRACT

A method for selectively recovering a metal from mined ore and other metal-bearing raw source materials is disclosed. The method involves mixing with an aqueous medium a metal-bearing ore and/or other raw source material containing a first metal in an insoluble form, insoluble and/or soluble Cr in a Cr bearing material as a second metal, and organic and inorganic compounds to obtain a slurry containing the first metal in an insoluble form, insoluble and/or soluble Cr compound(s), and the organic and inorganic compounds; adjusting the pH of the slurry to an optimal range for Cr oxidation to convert Cr to an insoluble form; optionally adding a first oxidizer to the slurry to oxidize organic and inorganic compounds; selectively leaching the Cr by adding a leaching agent in an amount sufficient to obtain Cr in a soluble form while the first metal remains in the slurry in an insoluble form; filtering the slurry to obtain a filter cake containing the first metal in an insoluble form and a filtrate containing Cr in a soluble form; and recovering the filter cake containing the first metal in an insoluble form and/or filtrate containing Cr in a soluble form.

15 Claims, 1 Drawing Sheet

U.S. PATENT DOCUMENTS

| | | |
|---|---|---|
| 5,200,088 A | 4/1993 | Pilznienski |
| 5,431,825 A | 7/1995 | Diel |
| 5,635,073 A | 6/1997 | Aktor et al. |
| 6,126,720 A | 10/2000 | Okada et al. |
| 6,147,274 A | 11/2000 | Wood et al. |
| 6,398,968 B1 | 6/2002 | Higby |
| 6,833,124 B2 | 12/2004 | Phelps et al. |
| 7,488,464 B2 | 2/2009 | Hammel et al. |
| 2005/0074380 A1* | 4/2005 | Boren et al. ............... 423/1 |
| 2008/0131343 A1 | 6/2008 | Oogjen et al. |
| 2009/0056501 A1 | 3/2009 | Mendes |
| 2009/0087361 A1 | 4/2009 | Rishea et al. |
| 2010/0320156 A1* | 12/2010 | Olaiya et al. ............ 210/748.1 |

OTHER PUBLICATIONS

Rapko, B.M. and Vienna, J.D., "Selective Leaching of Chromium from Hanford Tank Sludge 241-U-108", Pacific Northwest National Laboratory, Sep. 2002, entire publication, PNNL-14019, Washington, USA.

* cited by examiner

PROCESS FOR RECOVERING METALS AND METAL COMPOUNDS FROM MINED ORE AND OTHER METAL-BEARING RAW SOURCE MATERIALS

CROSS-REFERENCE TO RELATED APPLICATIONS

This application claims the benefit under 35 USC 119 (e) of provisional application No. 61/174,205 filed Apr. 30, 2009 and No. 61/293,419 filed Jan. 8, 2010, both of which are fully incorporated herein by reference.

BACKGROUND

A. Field

The present invention relates to a method for selectively recovering a metal, groups of metals, and/or metal compound(s) from a metal-bearing raw source material containing chromium (Cr).

B. Related Art

Industrial, mining, and manufacturing processes generate large amounts of metal-bearing raw source material on daily basis. This metal-bearing raw source material includes mining ores, ore concentrates, waste products, residues and byproducts. Metal-bearing raw source material often contains valuable nonferrous metals such as chromium (Cr), nickel (Ni), copper (Cu), cobalt (Co), tin (Sn), zinc (Zn), molybdenum (Mo), manganese (Mn), lead (Pb), cadmium (Cd), vanadium (V), as well as precious and platinum group metals including silver (Ag), gold (Au), palladium (Pd), platinum (Pt), rhodium (Rh), ruthenium (Ru), osmium (Os), and iridium (Ir).

The disposal of metal-bearing raw source material containing these metals raises serious environmental and business concerns on a global level due to the hazardous nature, potential toxicity, and risk to human health posed by the presence of these metals. The costs associated with the disposal of hazardous metal-bearing raw source material in the absence of metal reclamation are enormous. In this regard, recovery of metals from metal-bearing raw source material not only would reduce the volume and cost of disposal, but the recovered metals could be resold or reused to provide substantial economic value. The expenses and environmental impact associated with disposing of metal-bearing raw source material, along with the economic value of the incorporated metals, has generated interest in how to treat and recover metals from metal-bearing raw source material.

Current methods for treating and recovering metals from metal-bearing raw source material, however, are often inefficient and expensive to implement. It has been particularly challenging to treat and recover metals from metal-bearing raw source material that contains Cr, as Cr is difficult to separate from other metals and metal compounds.

For example, vitrification is a proven technique in the disposal and long-term storage of nuclear waste. However, the presence of Cr dramatically increases the bulk of the nuclear waste. In order to economize and reduce the quantity of nuclear waste, the Cr content is hydrometallurgically separated and removed, thereby decreasing the total amount of nuclear waste to be vitrified. See Rapko et al., "Selective Leaching of Chromium from Hanford Tank Sludge 241-U-108", Pacific Northwest National Laboratory, PNNL-14019, article prepared for the U.S. Department of Energy under Contract DE-AC06-76L01830. Rapko et al disclose that the Cr can be selectively leached from the nuclear waste through an oxidative alkaline leaching process. The process, however, utilizes expensive reactants and is not concerned with the recovery or economic value of other metals that might be present in the nuclear waste. The primary objective of Rapko et al. is to effectively reduce the vitrification cost by reducing the quantity of nuclear waste to be vitrified. The removal of the Cr component from the nuclear waste satisfies this objective by reducing the final quantity of waste that must be vitrified, thus lowering the overall cost of processing.

U.S. Pat. No. 5,200,088 describes a process for removing hexavalent chromium (Cr(VI)) from a waste product. This patent suggests that the most hazardous form of chromium is Cr(VI) and that the presence of Cr(VI) in the waste product must be reduced to a few parts per million (ppm) or less before the waste product can be discarded. In accordance with the process described in this patent, the Cr(VI) in the waste product is converted by treating the waste product with an alkali metal dithionite to reduce the Cr(VI) to trivalent chromium (Cr (III)). The result is a soluble material that forms a precipitate at reduced pH. The precipitate containing the Cr(III) can then be separated from the remaining waste product. However, the patent does not reveal any interest in the recovery or separation of other metals that may be present in the Cr-bearing waste.

U.S. Pat. No. 4,162,294 describes a method for recovering Cr and at least one other metal from a metal-bearing raw source material containing Cr. In particular, the method involves chlorinating a waste sludge containing Cr, aluminum (Al), Cu, Zn, and Ni to oxidize the Cr into a soluble form and to obtain an insoluble component that contains the Al, Cu, Zn, and Ni; separating the Cr in soluble form from the insoluble component with a fixed bed anion exchanger; and separating the Al, Cu, Zn, and Ni present in the insoluble component through an elaborate series of liquid-liquid extractions and precipitation steps.

However, ion exchange is relatively costly, slow, and cumbersome to use. In order to be effective, the Cr-bearing material being treated must be passed through a significant amount of ion-exchange resin, usually in the form of a filter bed, making it effective, in most cases, for treating only small volumes of wastewater. Thus, ion exchange would be impractical as an initial step for separating metals from complex metal-bearing raw source material. Furthermore, the series of liquid-liquid extractions and precipitation steps is also inefficient. When the ion exchange step and series of liquid-liquid extractions and precipitation are used in combination, the method is particularly inefficient and expensive to execute.

While the above publications focus on the removal of Cr, or the recovery of Cr and other metals with complicated and expensive processes, none of them are seen to disclose a method capable of selectively recovering at least one metal from a metal-bearing raw source material containing Cr in an efficient, relatively low cost manner.

SUMMARY

The present invention is based on the discovery of an efficient and effective method for selectively recovering at least one metal from a metal-bearing raw source material containing Cr in a soluble or insoluble form.

In a preferred embodiment of the invention, Ni is also recovered from a metal-bearing raw source material containing Ni and Cr.

More specifically, in accordance with a first aspect of the invention, a method for selectively recovering a metal from a metal-bearing raw source material comprises:

a) mixing with an aqueous medium a metal-bearing raw source material comprising a first metal in an insoluble form, soluble and/or insoluble Cr in a Cr bearing material as a second metal, and organic and inorganic compounds to obtain a slurry comprising the first metal in an insoluble form, soluble and/or insoluble Cr in a Cr bearing material and the organic and inorganic compounds;

b) adjusting the pH of the slurry to an alkaline pH sufficient to convert soluble Cr to an insoluble form;

c) optionally adding a first oxidizer to the slurry to facilitate subsequent oxidation steps;

d) selectively leaching the Cr by adding a leaching agent in an amount sufficient to convert Cr to a soluble form while the first metal remains in the slurry in an insoluble form;

e) filtering the slurry to obtain a filter cake comprising the first metal in an insoluble form and a filtrate comprising Cr in a soluble form;

f) recovering the filter cake comprising the first metal in an insoluble form and/or filtrate comprising Cr in a soluble form.

In accordance with another aspect of the invention, the first metal is Ni.

According to another aspect of the invention, Ni and Cr are selectively recovered from a metal-bearing raw source material in a process comprising:

a) mixing with an aqueous medium a metal-bearing raw source material comprising Ni compound(s) in an insoluble form as a first metal, insoluble Cr compound(s) as a second metal, and organic and inorganic compounds to obtain a slurry comprising Ni in an insoluble form, insoluble Cr, and the organic and inorganic compounds;

b) adjusting the pH of the slurry to facilitate subsequent oxidation steps;

c) optionally adding a first oxidizer to the slurry to oxidize the organic and inorganic compounds, d) adding a second oxidizer to the slurry in an amount sufficient to oxidize the Cr into a soluble form while the Ni remains in the slurry in an insoluble form;

e) filtering the slurry to obtain a filter cake comprising Ni in an insoluble form and a filtrate comprising Cr in a soluble form;

f) recovering the filter cake comprising Ni in an insoluble form; and g) optionally recovering the filtrate comprising Cr in a soluble form.

In accordance with another aspect of the invention, Ni and Cr are recovered from Ni and Cr bearing materials by a method comprising:

a) mixing with an aqueous medium a metal-bearing raw source material comprising Ni compound(s) in insoluble form, insoluble Cr compound(s) and organic and inorganic compounds to obtain a slurry comprising the first metal in an insoluble form, insoluble Cr, and the organic and inorganic compounds;

b) adding a hydroxide to the slurry to raise the pH of the slurry to 12.0-12.5 and in an amount sufficient to form chromium hydroxide ($Cr(OH)_3$), chromium oxide ($Cr_2O_3$), or mixtures thereof;

c) adding a first oxidizer comprising calcium hypochlorite to the slurry in an amount sufficient to oxidize said organic and inorganic compounds;

d) adding a second oxidizer comprising $MnO_4^-$ to the slurry in an amount sufficient to react with the $Cr(OH)_3$; $Cr_2O_3$, or mixtures thereof as follows:

$$2Cr(OH)_3 + 4MnO_4^- = 2CrO_4^{-2} + MnO_2 + 3O_2 \qquad (1)$$

or $$2Cr_2O_3 + 4MnO_4^- = 4CrO_4^{-2} + 8MnO_2 + 3O_2, \qquad (2)$$

wherein $CrO_4^{-2}$ is soluble and remains in the slurry to provide a chromate solution and $MnO_2$ is an oxide precipitate;

e) filtering the slurry to obtain a filter cake comprising Ni in an insoluble form and filtrate comprising chromate;

f) recovering the filter cake comprising Ni;

g) treating the filtrate comprising Cr(VI) with acid in an amount sufficient to obtain an acidic solution comprising Cr(VI);

h) adding sodium metabisulfite to the acidic solution in an amount sufficient so that the Cr(VI) reacts with the sodium metabisulfite to obtain a reaction as follows:

$$2CrO_4^{-2} + 2Na_2S_2O_5 = 2Cr^{+3} + 4NaSO_4 + O_2 \qquad (3)$$

i) adjusting pH of the acidic solution with a hydroxide in an amount sufficient to obtain a reaction as follows:

$$Cr^{+3} + 3NaOH = Cr(OH)_3 + 3Na^+ \qquad (4)$$

wherein $Cr(OH)_3$ is a Cr hydroxide precipitate;

j) filtering the solution comprising $Cr(OH)_3$ to obtain a $Cr(OH)_3$ filter cake; and k) recovering the Cr filter cake.

Additional details and variations of the described processes embodying the invention will be described in the detailed description below.

DETAILED DESCRIPTION OF PREFERRED EMBODIMENTS OF THE INVENTION

Figure 1:
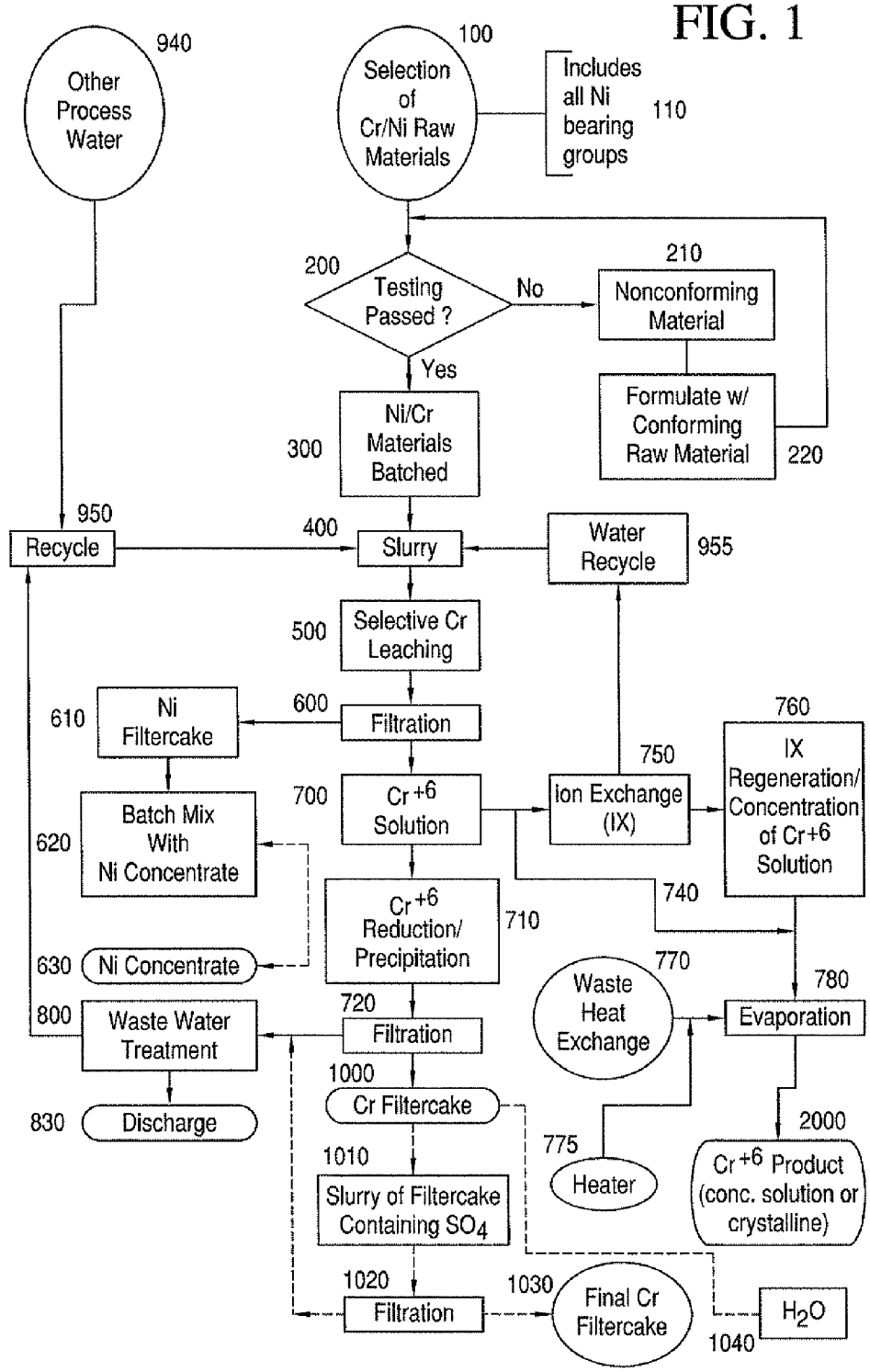
FIG. 1 is a flowchart exemplifying a method for recovering Ni and Cr from a Ni/Cr raw material in accordance with the invention.

The phrase "selectively leach" as used herein means to wash, extract, or perform a chemical reaction to separate a soluble element or compound from an insoluble material.

The phrase "insoluble form" means an element in free form or compound incapable of or that resists dissolving in a particular solvent.

A "metal-bearing raw source material" is any material that contains a metal. This includes waste, residue, ore, ore concentrate, byproduct, processed, and/or unprocessed material.

The phrase "plating sludge" is a hydroxide sludge, which has been formed during the treatment of waste liquor, metal plating, or other metal finishing processes and wastewaters which may or may not be dehydrated.

A "Ni/Cr raw material" is a material that contains Ni and Cr and/or Ni and Cr compounds and potentially other metals of value.

The phrase "predetermined criteria" means a previously determined standard that a metal-bearing raw source material must meet regarding a specific economic and elemental threshold, before being processed in accordance with the present invention.

The present invention relates to a method for selectively recovering a metal from a metal-bearing raw source material. The method involves mixing in an aqueous medium a metal-bearing raw source material containing (i) a first metal in an insoluble form, (ii) insoluble and/or soluble Cr in a Cr bearing material as a second metal, and (iii) organic and inorganic compounds to obtain a slurry. The slurry contains the first metal in an insoluble form to be recovered, the Cr bearing material, and the organic and inorganic compounds.

The first metal remains insoluble throughout the method. The first metal is preferably in an insoluble form that is incapable of or resists dissolving so that less than 1.0% of the first metal is in a soluble form at any given time during the method.

The pH of the slurry is then adjusted to facilitate the efficient oxidation of Cr in subsequent steps. The pH is preferably adjusted to an alkaline state, and more preferably to a pH of 12.0 to 12.5 to convert soluble Cr to insoluble Cr.

A first oxidizer is optionally added to the slurry to oxidize extraneous organic and inorganic compounds present in the slurry. The Cr in an initially insoluble form can then be selectively leached from insoluble components that may be present in the slurry by adding a leaching agent in an amount sufficient to obtain Cr in a soluble form. While the Cr will be converted to a soluble form, the first metal remains in the slurry in an insoluble form. The slurry may then be filtered to obtain a filter cake containing the first metal in an insoluble form and a filtrate containing Cr in a soluble form.

The filter cake containing the first metal in an insoluble form and/or filtrate comprising Cr in a soluble form may then be recovered.

The filter cake optionally contains additional metals (i.e., a third metal) that were present in the raw material and recovered along with the first metal. The other base, precious, and platinum group metals that may be recovered include but are not limited to Ni, Cu, Co, Sn, Zn, Mo, Mn, Pb, Cd, V, Ag, Au, Pd, Pt, Rh, Ru, Os, and Ir In a preferred embodiment of this invention, the first metal is Ni.

FIG. 1 depicts in a flowchart a preferred method for recovering Ni and Cr from a Ni/Cr raw material. The selected Ni/Cr raw material (110) may be any material that contains Ni and Cr, such as metal bearing ores and concentrates, metal plating and finishing sludges, industrial material, processed material, and/or unprocessed material.

Prior to processing, selection of the Ni/Cr raw material is determined by testing (100) to determine whether the Ni bearing groups satisfy predetermined criteria. For example, the Ni/Cr raw material is tested to determine whether a sufficient amount of metals are present in the Ni/Cr raw material. The Ni/Cr raw material preferably contains 5% by weight Ni and 5% by weight Cr, and more preferably 10-20% by weight of Ni and 10-15% by weight of Cr. The Ni/Cr raw material also can be tested to determine whether any deleterious constituents (e.g., Hg) are present. It is important to note that as economic conditions vary, improved conditions (i.e., metal price increases, processing chemicals cost decreases, etc.) may permit wider ranges of Ni/Cr content to be economically processed by this invention. All economic conditions as well as metals content (primary and secondary) must be considered on an individual basis when determining the viability of acceptance of the raw feedstock materials.

Ni/Cr raw material that satisfies the predetermined acceptance criteria is then approved for processing (200). Any material that does not meet the predetermined acceptance criteria based on metal content and other constituent content and/or economic considerations maybe designated as non-conforming material (210). For example, when the Ni/Cr raw material contains mineral or metal constituents which exhibit deleterious characteristics that prevent the material from being safely or effectively processed, the material may be rejected as non-conforming material or it could be used as an ingredient in a formulation with other conforming materials (220).

According to one aspect of the process, the nonconforming Ni/Cr raw material is formulated and combined with other conforming Ni/Cr raw material that has been found to satisfy the predetermined acceptance criteria (300).

In yet another aspect of the process, Ni/Cr raw material identified as non-conforming material may be combined as an ingredient with other Ni/Cr raw materials to provide a batch-formulation of material that does satisfy the predetermined process criteria. For example, a first lot of Ni/Cr raw material identified as "non-conforming" material when processed by itself and unacceptable to be processed individually, may be formulated with another raw material to provide a batch of Ni/Cr raw material that does satisfy the predetermined criteria.

A slurry is then formed by adding to an aqueous medium the Ni/Cr raw material batch or the formulated Ni/Cr material batch. In one embodiment, the aqueous medium is tap water. In another embodiment, the aqueous solution is any recycled water (940) or water recycled from a previous cycle using the described method (950 or 955). The Ni/Cr raw material present in the slurry at this stage will be in an amount of 1-10% by weight, and more preferably 2-5% by weight of the slurry.

The slurry is adjusted to an alkaline pH (e.g., a pH of 12) by the addition of a compound that accepts protons, for example caustic soda (50% NaOH) (400). Cr is present in the alkaline slurry in both the Cr(III) and Cr(VI) oxidation states. In its Cr(III) oxidation state, Cr is in the form of a Cr precipitate such as chromium hydroxide ($Cr(OH)_3$) or chromium oxide ($Cr_2O_3$). In its Cr(VI) oxidation state, Cr is in an alkaline soluble-form, such as chromate (i.e., a salt containing the anion Chromic Acid ($H_2CrO_4$ or $CrO_4^{2-}$). The Ni is present in the slurry in an insoluble form.

In order to separate the Ni in insoluble form from a Cr precipitate, the alkaline slurry is treated with an oxidizer. The oxidizer is preferably a permanganate ($MnO_4^-$) compound, such as, for example, potassium or sodium permanganate. The $MnO_4^-$ is preferably added in excess. The solution preferably has an Oxidation Reduction Potential (ORP) of +300 to +400, which is preferably maintained for 1-3 hours and more preferably for 2 hours so that a sufficient amount of $MnO_4^-$ can react with Cr in an insoluble form. The oxidizer converts Cr(III) to its more soluble form of Cr(VI) to form a chromate or dichromate solution. The reaction is exemplified as follows:

for $Cr(OH)_3$:

(1)

for $Cr_2O_3$:

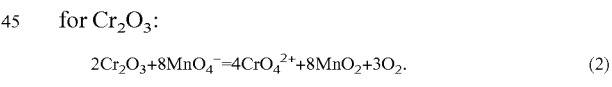

(2)

The chrome (Cr(VI)) compounds formed (e.g., $CrO_4^{2+}/Cr_2O_7^{-2}$) are soluble, whereas the $MnO_2$ compounds are insoluble. By converting the Cr(III) in the shiny to a more soluble form of Cr (i.e., Cr(VI)), the Cr can be selectively leached from the slurry.

For example, a first and second oxidizer can be added sequentially to the slurry. Oxidizers capable of converting Cr(III) to Cr(VI), are relatively expensive. To lower the process cost, a less expensive oxidizer may be first added to the alkaline slurry (i.e., a first oxidizer). The first oxidizer is added in an amount sufficient to react with extraneous organic and inorganic compounds (e.g., compounds not containing Cr) present in the slurry. An "amount sufficient' is preferably an amount wherein the first oxidizer is added in excess as indicated by a potassium iodide or starch test paper providing a color change when excess oxidizer is present. The first oxidizer is preferably a hypochlorite, such as calcium hypochlorite, ferrate, or ozone.

Once any extraneous organic and inorganic compounds have reacted with the first oxidizer, a more costly oxidizer capable of converting Cr(III) to Cr(VI) (i.e., the second oxidizer) can be added. In other words, the first oxidizer may be regarded as a "sacrificial" oxidizer that reacts with the extraneous organic and inorganic compounds. This allows for a greater amount of the more costly second oxidizer to react with the Cr of the Cr bearing material present in the slurry. By doing so, smaller amounts of the more costly second oxidizer will be required during the process, reducing the process cost. The second oxidizer is preferably added in excess to provide an ORP as discussed above. For example, approximately two pounds of $MnO_4^-$ can be added for each pound of the first oxidizer that was added to the alkaline slurry (500).

Once the reaction is complete, the slurry can then be filtered (600) to obtain a filter cake containing Ni and insoluble oxides such as $MnO_2$ (610). The Cr remains in a Cr(VI) solution (700) and can be optionally recovered as discussed below. Filtering methods and devices known to those skilled in the art can be used for this filtration step.

The filter cake containing Ni is optionally batched with other filter cakes (620) previously obtained in accordance with the method discussed above. The filter cake may then be further concentrated (630) by dehydration using methods and devices known to those skilled in the art.

The filter cake may also contain additional metals that were present in the raw material and that may be recovered along with the Ni. The other base, precious, and platinum group metals in the filter cake include but are not limited to Ni, Cu, Co, Sn, Zn, Mo, Mn, Pb, Cd, V, Ag, Au, Pd, Pt, Rh, Ru, Os, and Ir (i.e., third metals).

The Ni concentrate and other metals obtained from the process are optionally further separated by adding the Ni concentrate and other metals to a smelter. Smelting is a form of extractive metallurgy; its main use is to produce a metal from an ore. Smelting uses heat and a chemical reducing agent to change the oxidation state of the metal ore.

The resulting Cr(VI) solution (700) is preferably processed in one of two ways. In one embodiment, the Cr(VI) solution is processed (710, 720) into a chromium hydroxide filter cake (1000). In another embodiment, the Cr(VI) solution is processed (750, 760, 780) to obtain a concentrated Cr(VI) solution or crystalline Cr(VI) powder (2000).

When processed into a filter cake (1000), the Cr(VI) solution is reduced from $Cr^{+6}$ to $Cr^{+3}$ to form Cr hydroxide (710) by adjusting the pH of the Cr(VI) solution to an acidic pH (e.g., 1.0 to 2.0) with an acid, such as sulfuric acid ($H_2SO_4$) or nitric acid ($HNO_3$) (710) and then adding a reducing agent such as sodium metabisulfite ($Na_2S_2O_5$) to the solution. The resulting solution is maintained with stirring for preferably 30 minutes to 2 hours, and more preferably 1 hour to assure that a sufficient amount of reducing agent reacts with the Cr. The reaction is exemplified as follows:

$$2CrO_4^{-2} + 2Na_2S_2O_5 = 2Cr^{+3} + 4NaSO_4 + O_2. \quad (3)$$

Following the Cr reduction, the pH of the solution is raised to form an alkaline solution (e.g., having a pH of 9.0). The solution is preferably raised by adding a compound that accepts protons, for example caustic soda (50% NaOH) (710). The reaction is exemplified as follows:

$$Cr^{+3} + 3NaOH = Cr(OH)_3 + 3Na^+. \quad (4)$$

A Cr hydroxide precipitate is formed (710) and is preferably recovered in the form of a filter cake. In a preferred embodiment, the solution Cr precipitate is recovered with a filter press (720) to produce a chromium hydroxide filter cake (1000). Filtering methods known to those skilled in the art can be used for this filtration step.

The chromium hydroxide filter cake (1000) may contain elevated concentrations of sulfate resulting from the production of $NaSO_4$ during the previous chrome reduction reaction. Water soluble $NaSO_4$ is retained in the interstitial waters of the filter cake. A low sulfate chromium hydroxide product is more commercially desirable, therefore the chromium hydroxide filter cake (1000) containing elevated concentrations of sulfate can be optionally further processed by re-slurrying (1010) the chromium hydroxide filter cake (1000) with a solids solution (e.g. 10% solid solution) to leach out the sulfate, and recovering a second chromium hydroxide filter cake with a filter press (1020). Water soluble sulfate compounds and other water soluble compounds are contained in the filtrate and removed from the filter cake.

An alternate sulfate reduction method involves "washing" (1040) the initial filter cake, while still contained in the filter press, by passing a sufficient volume of fresh water through the press to reduce the sulfate content to a desirable level. This alternate washing procedure is preferably used when lesser amounts of sulfate need to be removed.

These optional slurrying and filtration steps produce a chromium hydroxide filter cake (1030) with a higher purity.

The resulting filtrate may then be further treated (800) and recycled (950) as the aqueous solution in the slurrying step (400).

As noted above, the Cr(VI) solution may be processed into a concentrated Cr(VI) solution or powder (2000). The Cr(VI) solution may be concentrated by ion exchange (750) and/or concentrated by evaporation (780). In this aspect of the invention, the Cr(VI) solution is either directly (740) subjected to an evaporation/crystallization process (780) from the selective leaching process (700) or alternatively, passed from the selective leaching procedure (700) through an ion exchange column (750) to selectively remove the Cr. The Cr(VI) is loaded onto column by passing the Cr(VI) solution over the column. The aqueous fraction exiting the column is substantially free of Cr and can be re-used (955).

When the Cr(VI) has been loaded onto the column (750), the ion exchange resin may be regenerated by eluting the resin with a hydroxide solution, such as a 5% NaOH solution (760). The eluted Cr(VI) solution is then preferably further concentrated. In one aspect of the invention, the eluted Cr(VI) solution is concentrated 5-10 fold (760).

The eluted Cr(VI) solution may then be evaporated (780) with the use of a heating source such as waste heat exchange (770) or a heater (775) to obtain a concentrated Cr(VI) solution or crystalline Cr(VI) powder (2000). Evaporating and drying methods and devices known to those skilled in the art can be used for this evaporation step.

In yet another embodiment, the present invention relates to a composition produced by the above-identified method, wherein said composition preferably comprises Ni or Cr.

The foregoing description of the invention has been presented describing certain operable and preferred aspects. It is not intended that the invention should be so limited since variations and modifications thereof will be obvious to those skilled in the art, all of which are within the spirit and scope of the invention.

What is claimed is:

1. A method for selectively recovering a metal from a metal-bearing raw source material, comprising:
   a) mixing with an aqueous medium a metal-bearing raw source material comprising a first metal in an insoluble form, soluble and/or insoluble Cr in a Cr bearing material as a second metal, and organic and inorganic compounds to obtain a slurry comprising the first metal in an insoluble form, soluble and/or insoluble Cr in a Cr bearing material and the organic and inorganic compounds;

b) adjusting the pH of the slurry to an alkaline pH sufficient to convert soluble Cr present to an insoluble form;

c) adding a first oxidizer to the slurry to facilitate subsequent oxidation steps;

d) selectively leaching the Cr by adding $MnO_4^-$ in an amount sufficient to convert Cr to a soluble form while the first metal remains in the slurry in an insoluble form;

e) filtering the slurry to obtain a filter cake comprising the first metal in an insoluble form and a filtrate comprising Cr in a soluble form;

f) recovering the filter cake comprising the first metal in an insoluble form and/or filtrate comprising Cr in a soluble form.

2. The method according to claim 1, wherein the first oxidizer is added in amount sufficient to oxidize the organic and inorganic compounds.

3. The method according to claim 2, wherein the first oxidizer is calcium hypochlorite.

4. The method according to claim 1, wherein the first metal is selected from the group consisting of nickel (Ni), copper (Cu), cobalt (Co), tin (Sn), zinc (Zn), molybdenum (Mo), manganese (Mn), lead (Pb), cadmium (Cd), vanadium (V), silver (Ag), gold (Au), palladium (Pd), platinum (Pt), rhodium (Rh), ruthenium (Ru), osmium (Os), and iridium (Ir).

5. The method according to claim 1, wherein the first metal is Ni.

6. The method according to claim 1, wherein the metal-bearing raw source material further comprises a third metal that is different from the first metal and Cr, wherein said third metal is in an insoluble form throughout steps a)-e), and wherein said third metal is recovered in the filter cake composition comprising the first metal.

7. The method according to claim 6, wherein the third metal is selected from the group consisting of (Ni), copper (Cu), cobalt (Co), tin (Sn), zinc (Zn), molybdenum (Mo), manganese (Mn), lead (Pb), cadmium (Cd), vanadium (V), silver (Ag), gold (Au), palladium (Pd), platinum (Pt), rhodium (Rh), ruthenium (Ru), osmium (Os), and iridium (Ir).

8. The method according to claim 6, wherein the first metal is Ni and the third metal is Cu.

9. A method for selectively recovering nickel (Ni) and chromium (Cr) from a metal-bearing raw source material, comprising:

a) mixing with an aqueous medium a metal-bearing raw source material comprising Ni compound(s) in an insoluble form as a first metal, insoluble and/or soluble Cr compound(s) as a second metal, and organic and inorganic compounds to obtain a slurry comprising Ni in an insoluble form, insoluble and/or soluble Cr, and the organic and inorganic compounds;

b) adjusting the pH of the slurry to facilitate subsequent oxidation steps;

c) adding a first oxidizer to the slurry to oxidize the organic and inorganic compounds, d) adding $MnO_4^-$ to the slurry in an amount sufficient to oxidize the Cr into a soluble form while the Ni remains in the slurry in an insoluble form;

e) filtering the slurry to obtain a filter cake comprising Ni in an insoluble form and a filtrate comprising Cr in a soluble form;

f) recovering the filter cake comprising Ni in an insoluble form; and g) optionally recovering the filtrate comprising Cr in a soluble form.

10. The method according to claim 9, wherein the first oxidizer is calcium hypochlorite.

11. The method according to claim 9,
wherein the metal-bearing raw source material further comprises a third metal,
wherein said third metal is in an insoluble form throughout steps a)-g), and
wherein said third metal is recovered in the filter cake comprising Ni.

12. The method according to claim 11, wherein the third metal is selected from the group consisting of copper (Cu), cobalt (Co), tin (Sn), zinc (Zn), molybdenum (Mo), manganese (Mn), lead (Pb), cadmium (Cd), vanadium (V), silver (Ag), gold (Au), palladium (Pd), platinum (Pt), rhodium (Rh), ruthenium (Ru), osmium (Os), and iridium (Ir).

13. The method according to claim 9, further comprising adjusting the pH of the slurry to 12.0-12.5 in step b) to form chromium hydroxide ($Cr(OH)_3$), chromium oxide ($Cr_2O_3$), or mixtures thereof.

14. The method according to claim to 13, further comprising adding $KMnO_4$ as a second oxidizer in excess in step c) to obtain a reaction as follows:

$$2Cr(OH)_3 + 4MnO_4^- = 2CrO_4^{-2} + 4MnO_2 + 3O_2 + 6H^+ \text{ or} \quad (1)$$

$$2Cr_2O_3 + 8MnO_4^- = 4CrO_4^{-2} + 8MnO_2 + 3O_2, \quad (2)$$

wherein $CrO_4^{-2}$ is soluble and remains in the slurry to provide a Cr(VI) solution and $MnO_2$ is an oxide precipitate.

15. The method according to claim 9, wherein the slurry is filter pressed in step d).

* * * * *